(12) United States Patent
Tagashira et al.

(10) Patent No.: US 12,384,678 B2
(45) Date of Patent: Aug. 12, 2025

(54) ALUMINUM NITRIDE POWDER AND METHOD FOR MANUFACTURING THE SAME

(71) Applicant: Tokuyama Corporation, Shunan (JP)

(72) Inventors: Yoshinori Tagashira, Shunan (JP); Yoshiaki Yamashita, Shunan (JP); Masato Hamamoto, Shunan (JP)

(73) Assignee: Tokuyama Corporation, Shunan (JP)

( * ) Notice: Subject to any disclaimer, the term of this patent is extended or adjusted under 35 U.S.C. 154(b) by 0 days.

(21) Appl. No.: 17/798,383

(22) PCT Filed: Feb. 4, 2021

(86) PCT No.: PCT/JP2021/004061
§ 371 (c)(1),
(2) Date: Aug. 9, 2022

(87) PCT Pub. No.: WO2021/161883
PCT Pub. Date: Aug. 19, 2021

(65) Prior Publication Data
US 2023/0080620 A1    Mar. 16, 2023

(30) Foreign Application Priority Data
Feb. 10, 2020    (JP) ................................ 2020-020555

(51) Int. Cl.
*C01B 21/072*    (2006.01)

(52) U.S. Cl.
CPC ...... *C01B 21/0726* (2013.01); *C01P 2004/32* (2013.01); *C01P 2004/50* (2013.01);
(Continued)

(58) Field of Classification Search
None
See application file for complete search history.

(56) References Cited

U.S. PATENT DOCUMENTS

| 9,403,680 B2 | 8/2016 | Fukunaga et al. |
| 11,427,470 B2 | 8/2022 | Inaki et al. |
| (Continued) | | |

FOREIGN PATENT DOCUMENTS

| CN | 103079995 A | 5/2013 |
| CN | 104968601 A | 10/2015 |
| (Continued) | | |

OTHER PUBLICATIONS

English abstract of Ikeda et al. JP 2005-162555 (Year: 2005).*
(Continued)

*Primary Examiner* — Ronak C Patel
(74) *Attorney, Agent, or Firm* — The Webb Law Firm

(57) ABSTRACT

Provided is an aluminum nitride powder useful as a raw material when an aluminum nitride sintered body excellent as an insulating high thermal conductive member is manufactured, particularly, by press molding. An aluminum nitride powder includes particles having a sphericity of 0.8 or more, in which a median size $D_{50}$ obtained by a laser diffraction method is 0.5 to 1.5 μm, a ratio $D_{90}/D_{50}$ of a particle size $D_{90}$ corresponding to a cumulative undersize distribution of 90% to the $D_{50}$ is 2.2 or less, a BET specific surface area is 2 to 4 m$^2$/g, and a total oxygen concentration is 0.6 to 1.2% by mass.

4 Claims, 2 Drawing Sheets

(52) U.S. Cl.
CPC ...... *C01P 2004/61* (2013.01); *C01P 2004/62* (2013.01); *C01P 2006/12* (2013.01)

(56) References Cited

U.S. PATENT DOCUMENTS

| | | |
|---|---|---|
| 2015/0376009 A1 | 12/2015 | Fukunaga et al. |
| 2019/0389725 A1 | 12/2019 | Inaki et al. |

FOREIGN PATENT DOCUMENTS

| | | | |
|---|---|---|---|
| JP | S58091019 A | | 5/1983 |
| JP | H02048408 A | | 2/1990 |
| JP | H102102109 A | | 4/1990 |
| JP | H04265208 A | | 9/1992 |
| JP | H05017109 A | | 1/1993 |
| JP | H05043209 A | | 2/1993 |
| JP | 2525074 B2 | | 8/1996 |
| JP | 3479160 B2 | | 12/2003 |
| JP | 2005162555 A | | 6/2005 |
| JP | 2007182340 A | | 7/2007 |
| JP | 2019147709 A | | 9/2019 |
| TW | 201823150 A | | 7/2018 |
| WO | WO 9620127 | * | 7/1996 |

OTHER PUBLICATIONS

English translation of Hitomi et al. (JP 2019/147709) (Year: 2019).*
Ashizawa Finetech Ltd., "About the types and characteristics of the disperser", Internet Archive "Wayback Machine", 2019, https://web.archive.org/web/20191221074738/https://www.ashizawa.com/guidance/08.html.
Bachelard, R. et al., "Aluminum Nitride by Carbothermal Nitridation", Materials Science and Engineering, 1989, pp. 247-251, vol. A109.
Nakayama, Niro, et al., Grinding Technology by Super Sonic Jet Mill & Fine Classifying Technology, Resources Processing, 1986, pp. 189-198, vol. 33. No. 4.

* cited by examiner

ALUMINUM NITRIDE POWDER AND METHOD FOR MANUFACTURING THE SAME

CROSS-REFERENCE TO RELATED APPLICATIONS

This application is the United States national phase of International Application No. PCT/JP2021/004061 filed Feb. 4, 2021, and claims priority to Japanese Patent Application No. 2020-020555 filed Feb. 10, 2020, the disclosures of which are hereby incorporated by reference in their entirety.

BACKGROUND OF THE INVENTION

Field of the Invention

The present invention relates to an aluminum nitride powder useful as a raw material when an aluminum nitride sintered body excellent as an insulating high thermal conductive member is manufactured, particularly, by press molding, and a method for manufacturing the aluminum nitride powder.

Description of Related Art

The aluminum nitride sintered body is widely used as a heat dissipation material or an electric insulation material for applications such as a heat dissipation substrate of an electric device, an electronic circuit board, and a member for a semiconductor manufacturing apparatus by taking advantage of high thermal conductivity and a high insulation property which are characteristics of aluminum nitride.

One method for manufacturing the aluminum nitride sintered body is a method for molding an aluminum nitride powder into a granular shape, then press-molding the granular aluminum nitride powder, and heat-sintering the press-molded product (Patent Literature 1: JP 3479160 B2).

By the way, the granular aluminum nitride powder is generally manufactured by mixing the aluminum nitride powder with a solvent and furthermore, appropriately, a binder to prepare a slurry, and granulating the slurry by spray drying (Patent Literature 2: JP 2525074 B2).

However, when a sintered body is manufactured using the granular aluminum nitride powder, the bulk density of the granules, consequently the bulk density of a molded body is not increased, a sintered body obtained by firing the molded body is not sufficiently densified, and the thermal conductivity and strength of the obtained sintered body decrease disadvantageously.

As a raw material aluminum nitride powder used for such an application, a powder manufactured by a so-called reduction-nitridation method for nitriding an alumina powder in the presence of carbon in a nitrogen gas atmosphere is known. The aluminum nitride powder obtained by the reduction-nitridation method includes spherical primary particles and have a favorable filling property, but includes many slightly sintered aggregated particles due to heat during reduction-nitridation, and cannot achieve a high bulk density. Therefore, pulverization has been performed in order to reduce the aggregated particles.

For example, it is known that an aluminum nitride powder containing a carbon powder taken out from a reduction-nitridation furnace is pulverized (Patent Literature 3: JP H2-102109 A, Patent Literature 4: JP H5-17109 A, Patent Literature 5: JP H5-43209 A, and Patent Literature 6: JP H4-265208 A).

In addition, as a method for crushing the aluminum nitride powder after nitridation, it is disclosed to use a pulverizer such as a dry ball mill or pin mill (Patent Literature 7: JP 2005-162555 A).

SUMMARY OF INVENTION

Technical Problem

However, when strong pulverization is performed using a medium such as a ball mill as a pulverizing means, primary particles of aluminum nitride are partially pulverized. As a result, the specific surface area of the aluminum nitride powder is increased to decrease storage stability, the amount of impurities mixed is increased, and furthermore, the oxidation amount in a subsequent decarburization treatment is also increased. A new problem that performance of a sintered body obtained by using this powder decreases has also been revealed.

Solution to Problem

Therefore, in order to solve the above problems, the present inventors made intensive studies, and as a result, have found that as for a raw material for manufacturing aluminum nitride granules to be used for press molding, the bulk density of the aluminum nitride granules can be increased by disintegration to such an extent that large aggregated particles are crushed without strongly pulverizing the aluminum nitride powder containing a carbon powder taken out from a reduction-nitridation furnace.

In addition, the present inventors have found that, according to the above disintegrating, the specific surface area of the aluminum nitride powder does not become extremely high, an increase in the oxidation amount in a subsequent oxidation treatment for decarburization (also referred to as decarburization treatment) is also suppressed, and an effect of preventing a decrease in thermal conductivity is also exhibited.

Furthermore, the present inventors have found that a treatment with an ejector is particularly effective as the disintegrating means.

Then, based on the above findings, the present inventors have found that it is possible to provide an aluminum nitride powder having predetermined characteristics which has not been conventionally provided, and have completed the present invention.

The configuration of the present invention is as follows.

[1] An aluminum nitride powder including primary particles having a sphericity of 0.8 or more, in which
a median size $D_{50}$ obtained by a laser diffraction method is 0.5 to 1.5 μm, and a ratio $D_{90}/D_{50}$ of a particle size $D_{90}$ corresponding to a cumulative undersize distribution of 90% to the $D_{50}$ is 2.2 or less,
a BET specific surface area is 2 to 4 m²/g, and
a total oxygen concentration is 0.6 to 1.2% by mass.
[2] The aluminum nitride powder according to [1], in which the degree of aggregation calculated from the median size $D_{50}$ and the BET specific surface area by the following formula is within a range of 1.1 to 2.2.

Degree of aggregation=$D_{50}/D_{BET}$ $D_{BET}=6/(\rho \times S)$

S: BET specific surface area
$D_{BET}$: primary particle size calculated from BET specific surface area
$D_{50}$: a median size obtained by laser diffraction method
ρ: true specific gravity of AlN (3.26 g/cm³)

[3] A method for manufacturing an aluminum nitride powder, the method including: disintegrating a synthetic powder containing aluminum nitride aggregated particles and a carbon powder obtained by reducing and nitriding a raw material powder containing an aluminum oxide powder and a carbon powder under nitrogen without using a medium; and then oxidizing and removing excess carbon.

[4] The method for manufacturing an aluminum nitride powder according to [3], in which the disintegration treatment is performed with an ejector.

Advantageous Effects of Invention

The aluminum nitride powder of the present invention has a characteristic that primary particles thereof have a high sphericity by adopting a reduction-nitridation method. In addition, according to the disintegration treatment in the manufacturing method of the present invention, as an aluminum nitride powder obtained by performing the disintegration treatment, an aluminum nitride powder having a specific particle size distribution in which a shoulder due to coarse particles disappears and a peak top portion increases in a particle size distribution curve as compared with a particle size distribution of an aluminum nitride powder manufactured without performing the treatment can be obtained. In addition, an increase in the specific surface area after the treatment as compared with that before the treatment is suppressed to be low. In addition, the aluminum nitride powder having such characteristics achieves a high pressurized bulk density, and granules obtained by using the aluminum nitride powder have a high bulk density. Therefore, high thermal conductivity and strength can be imparted to a sintered body obtained by press-molding the granules.

In addition, as described above, the aluminum nitride powder of the present invention has a smaller amount of oxygen and can provide a sintered body having higher thermal conductivity in combination with the particle size distribution than an aluminum nitride powder obtained by performing a disintegration treatment.

DESCRIPTION OF THE INVENTION

Figure 1:
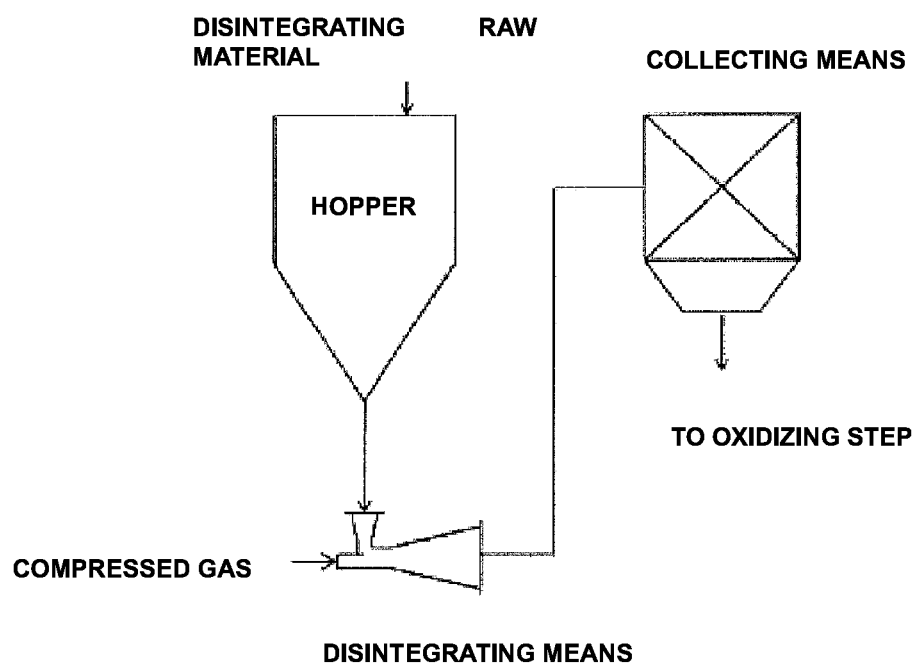
FIG. 1 is a schematic diagram illustrating an example of a disintegration treatment apparatus for aggregated particles.

Hereinafter, an embodiment of the present invention will be described.
[Aluminum Nitride Powder]

An aluminum nitride powder according to the present invention includes primary particles having a sphericity of 0.8 or more, preferably 0.9 or more. That is, in the aluminum nitride powder according to the present invention, the particle shapes of the primary particles are uniform in a spherical shape. The characteristics of the shape of the aluminum nitride powder can be confirmed by observation with a SEM photograph.

In addition, in the aluminum nitride powder, a median size $D_{50}$ obtained by a laser diffraction method is 0.5 to 1.5 μm, preferably 0.8 to 1.3 μm, and a ratio $D_{90}/D_{50}$ of a particle size $D_{90}$ corresponding to a cumulative undersize distribution of 90% to the $D_{50}$ is 2.2 or less, preferably 2.0 or less. The aluminum nitride powder having such a value of $D_{90}/D_{50}$ has a sharp particle size distribution and has uniform particle shape, and therefore has a high pressurized bulk density. A shrinkage ratio of a molded body using the aluminum nitride powder after firing is highly suppressed. Therefore, an aluminum nitride sintered body having excellent dimensional accuracy and effectively reduced warpage and distortion can be obtained.

In addition, the aluminum nitride powder has a BET specific surface area of 2 to 4 m²/g, preferably 2 to 3 m²/g, and a total oxygen concentration of 0.6 to 1.2% by mass. The total oxygen concentration is increased by a mechanochemical effect. A powder having a total oxygen concentration within the above range indicates that the powder is not subjected to a large impact. Even at this total oxygen content, sintering proceeds sufficiently, and a sintered body excellent in physical properties such as thermal conductivity can be obtained.

In addition, in the aluminum nitride powder according to the present invention, the degree of aggregation calculated from the median size $D_{50}$ and the BET specific surface area by the following formula is within a range of 1.1 to 2.2, preferably within a range of 1.3 to 2.0. Since the aluminum nitride powder of the present invention has a low degree of aggregation, granules which have high dispersibility in, for example, a resin or a solvent, and are easily crushed can be manufactured.

Degree of aggregation=$D_{50}/D_{BET}$
$D_{BET}=6/(\rho \times S)$
S: BET specific surface area
$D_{BET}$: particle size calculated from BET specific surface area
$D_{50}$: a median size obtained by laser diffraction method
ρ: true specific gravity of AlN (3.26 g/cm³)

A method for manufacturing such an aluminum nitride powder according to the present invention is not particularly limited, but for example, the aluminum nitride powder can be manufactured by the following manufacturing method.
[Method for Manufacturing Aluminum Nitride Powder]

A synthetic powder containing aluminum nitride aggregated particles and a carbon powder obtained by reducing and nitriding a raw material powder containing an aluminum oxide powder and a carbon powder under nitrogen is disintegrated without using a medium, and then excess carbon is oxidized and removed.

In the present invention, first, a mixed powder of an alumina powder and a carbon powder is caused to react at 1400 to 1700° C. for two to ten hours in an atmosphere containing nitrogen by a reduction-nitridation method to synthesize an aluminum nitride powder.

As an average particle size of the alumina powder used in the present invention, a size used in a known reduction-nitridation method is adopted without any particular limitation. For example, generally, the median size is 0.15 μm or more and 1.5 μm or less, and preferably 0.5 μm or more and 1.2 μm or less.

The raw material carbon powder is not particularly limited, and examples thereof include acetylene black, channel black, furnace black, and graphite powder. Among these, acetylene black is preferable from a viewpoint of higher purity. The specific surface area of the carbon powder is not particularly limited, but is preferably 0.01 to 500 m²/g.

A method for mixing and dispersing the alumina powder and the carbon powder may be any known method, and is not particularly limited, but for example, various mixers such as a ball mill can be used.

The raw material powder is nitrided at 1400° C. to 1700° C. under a nitrogen atmosphere. Nitridation is performed by a usual method until the raw material powder is completely nitrided. In order to facilitate completion of the reduction-nitridation reaction, a carbon powder having a reaction equivalent or more to the alumina powder is usually used. A mixing ratio between the alumina powder and the carbon powder is preferably within a range of 3.5 to 5.0 in terms of carbon/alumina molar ratio. When the molar ratio is less than 3.5, alumina that has not reacted remains. On the other hand, when the molar ratio is too large, cost for removing carbon is increased, which is not economical.

In a synthetic powder obtained by the reduction-nitridation reaction, generally 5 to 30% by mass, particularly about 10 to 20% by mass of carbon remains.

By performing the disintegration treatment in a state where the carbon remains, an effect of preventing generation of coarse particles due to re-aggregation of crushed particles is exhibited.

In the present invention, as the disintegration treatment of the synthetic powder, it is necessary to adopt a disintegrating means not using a medium such as balls or beads, specifically, for example, a treatment with an ejector, a treatment with a Laval nozzle, or a treatment with a jet mill.

As a means for disintegrating the synthetic powder, in particular, a treatment with an ejector capable of performing disintegrating using acceleration of an air flow and a shear flow is suitably adopted from viewpoints that an effect can be obtained by a simple apparatus and generation of a fine powder at the time of disintegrating is suppressed as much as possible to stabilize the quality.

Specifically, as suitable treatment conditions with the ejector, the pressure of a compressed gas (generally air) supplied to the ejector is 0.1 to 1 MPa, preferably 0.2 to 0.7 MPa, and the concentration of the synthetic powder to be treated in an air flow is 1.00 kg/m$^3$ or less, preferably 0.02 to 0.60 kg/m$^3$ at normal pressure.

In addition, according to the disintegration treatment, the specific surface area of the synthetic powder, furthermore, the specific surface area of an aluminum nitride powder finally obtained by decarburizing the synthetic powder has a change ratio of 10% or less, which is extremely small, between the specific surface area before disintegrating and the specific surface area after disintegrating.

From this, it is estimated that particles on a small size side, particularly primary particles are not pulverized by the disintegration treatment. In addition, by this disintegration treatment, D50 and D10, of the aluminum nitride powder finally obtained have a small change between the treated particles and the untreated particles. Herein, D10 is a particle size corresponding to a cumulative undersize distribution with 10%. However, D90 is decreased by the treatment, and a predetermined particle size ratio of the present invention is satisfied.

In the present invention, since the synthetic powder after the disintegration treatment contains excess carbon powder as described above, by performing a decarburization treatment, an aluminum nitride powder can be obtained. For the decarburization treatment, a known method for burning excess carbon powder using an oxidizing gas at a high temperature is adopted without particular limitation.

For example, as the oxidizing gas at the time of performing the decarburization treatment, any gas that can oxidize carbon, such as air or oxygen, can be adopted without limitation, but air is suitable in consideration of economic efficiency and the oxygen content of aluminum nitride to be obtained. In addition, when the decarburization treatment is performed in an air atmosphere at normal pressure, since rapid oxidation of aluminum nitride occurs at about 1200° C. or higher, a treatment temperature is preferably 500 to 1100° C., and more preferably 600 to 900° C. in consideration of decarburization efficiency and excessive oxidation of an aluminum nitride surface.

Time for the decarburization treatment only needs to be appropriately set according to the degree of reduction in carbon. However, for example, when the decarburization treatment is performed at 600 to 900° C., the time for the decarburization treatment is one to six hours.

In such a method for manufacturing an aluminum nitride powder according to the present invention, for example, the following manufacturing apparatus can be used.

That is, an apparatus including a transfer device (also referred to as a hopper) for transferring a nitrided synthetic powder to a disintegrating means, a disintegrating means disposed below the hopper, and a collecting means for collecting a disintegrated powder, as illustrated in FIG. 1, is used.

As the hopper, a known hopper can be adopted without particular limitation, and a hopper having a container shape such as a conical shape or an inverted quadrangular pyramid shape is suitably used because a powder is hardly retained at a bottom due to the shape.

An outlet of the hopper is connected to a disintegrating means such that the synthetic powder can be introduced into the disintegrating means. As the disintegrating means, a disintegrating means not using a medium such as an ejector as described above is suitably adopted. The disintegrated synthetic powder is collected by a collecting means such as a bag filter through a pipe and then sent to an oxidation step.

According to an aspect in which a treatment apparatus used in a transport pipe for the synthetic powder such as the ejector is adopted, disintegrating can be performed simultaneously with transport of the synthetic powder, and the disintegration treatment can be performed very advantageously in an industrial view.

The aluminum nitride powder obtained by the present invention can be suitably used, for example, as a raw material for manufacturing a sintered body. Specifically, when the aluminum nitride powder is processed into, for example, aluminum nitride granules as a raw material for press molding or a sheet molded body by a known method, it is possible to obtain a sintered body in which a shrinkage ratio is highly suppressed, dimensional accuracy is excellent, and warpage and distortion are effectively reduced.

A method for manufacturing the aluminum nitride granules will be specifically exemplified. With the aluminum nitride powder obtained by the present invention, a known sintering aid that can be used for sintering aluminum nitride, for example, an alkaline earth metal oxide such as calcium oxide or strontium oxide, a rare earth oxide such as yttrium oxide or lanthanum oxide, or a composite oxide such as calcium aluminate, is mixed within such a range that the ratio of the sintering aid to the total amount of the aluminum nitride powder and the sintering aid is 0.1 to 10% by mass, and the resulting mixture is molded into a granular form.

In addition to the above component, the aluminum nitride granules may contain, for example, a surface active agent, a binder, a lubricant, or a plasticizer containing an organic component as necessary.

The surface active agent is generally used for enhancing dispersibility of a ceramic powder in a slurry, and a known surface active agent is adopted without any limitation as the surface active agent of the present invention. However, in particular, a surface active agent having a hydrophilic-lipophilic balance (hereinafter, abbreviated as HLB) of 4.5 to 18 is preferably used. When the HLB is lower than 4.5, dispersion of a slurry of the aluminum nitride powder is insufficient, and therefore the thermal conductivity of an aluminum nitride sintered body to be obtained tends to decrease. When the HLB is higher than 18, the strength of a molded body tends to decrease.

Note that the HLB is a value calculated by the Davis formula.

Specific examples of the surface active agent that can be suitably used include carboxylated trioxyethylene tridecyl ether, diglycerin monooleate, diglycerin monostearate, carboxylated heptaoxyethylene tridecyl ether, tetraglycerin monooleate, hexaglycerin monooleate, polyoxyethylene sorbitan monolaurate, and polyoxyethylene sorbitan monooleate. Two or more kinds of surface active agents may be mixed and used.

These surface active agents are usually selected and used within a range of 0.01 to 10 parts by mass, preferably 0.02 to 3.0 parts by mass with respect to 100 parts by mass of the aluminum nitride powder. When the amount of the surface active agent is less than 0.01 parts by mass, dispersion of the slurry is insufficient, and when the amount of the surface active agent is more than 10 parts by mass, the strength of the molded body decreases, which is not preferable.

In addition, as the binder, a binder generally used for molding a ceramic powder can be used without any limitation. For example, one kind or a mixture of two or more kinds selected from organic polymers such as oxygen-containing organic polymers such as polyvinyl butyral, polymethyl methacrylate, polyethyl methacrylate, poly 2-ethylhexyl methacrylate, polybutyl methacrylate, polyacrylate, cellulose acetate butyrate, nitrocellulose, methyl cellulose, hydroxymethyl cellulose, polyvinyl alcohol, polyoxyethylene oxide, and polypropylene oxide; hydrocarbon-based synthetic resins such as a petroleum resin, polyethylene, polypropylene, and polystyrene; polyvinyl chloride; and a wax and an emulsion thereof are used. The molecular weight of the organic polymer used as the binder is not particularly limited, but in general, when an organic polymer having a molecular weight of 3,000 to 1,000,000, preferably 5,000 to 300,000 is used, the density of an aluminum nitride powder molded body obtained by press molding increases, which is preferable.

In addition, in the aluminum nitride granules, as for a mixing ratio between the aluminum nitride powder and the binder, a ratio of the binder with respect to 100 parts by mass of the aluminum nitride is preferably 0.1 to 30 parts by mass. When the ratio is less than the above range, it is difficult to mold a favorable molded body due to insufficient strength. When the ratio is more than the above range, the physical properties of an aluminum nitride sintered body obtained by press-molding and firing the aluminum nitride granules tend to deteriorate.

Furthermore, if necessary, for example, a lubricant for enhancing pressure transmission during press molding or a plasticizer for enhancing collapsibility of granules may be used at a ratio of 5 parts by mass or less with respect to 100 parts by mass of the aluminum nitride powder.

As an organic solvent preferably used for manufacturing granules, for example, one kind or a mixture of two or more kinds selected from ketones such as acetone, methyl ethyl ketone, and methyl isobutyl ketone; alcohols such as ethanol, propanol, and butanol; aromatic hydrocarbons such as benzene, toluene, and xylene; esters such as ethyl acetate and butyl acetate; and halogenated hydrocarbons such as trichloroethylene, tetrachloroethylene, and bromochloromethane are used. The amount of the organic solvent is selected and used from a range of 20 to 200 parts by mass with respect to 100 parts by mass of aluminum nitride.

The above-described components are mixed and formed into a slurry, and then the slurry is formed into aluminum nitride granules by a known granulation method such as a spray dryer method.

The aluminum nitride granules are formed into a press-molded body by a so-called dry press method in which the aluminum nitride granules are filled in a predetermined molding die and pressurized by a press molding machine.

When the aluminum nitride powder obtained by the present invention is used as a raw material, by selectively disintegrating and reducing large aggregated particles of the aluminum nitride powder, a pressurized bulk density can be increased. As a result, a filling property during press molding can be improved, the bulk density of a press-molded body, consequently the sintering density of a sintered body to be obtained can be sufficiently increased, and an aluminum nitride sintered body having further improved thermal conductivity can be obtained.

EXAMPLES

Hereinafter, specific examples of the present invention will be described with reference to Examples, but the present invention is not limited to these Examples at all.

(1) Particle Sizes Having a Volumetric Cumulative Undersize Distribution of 10%, 50% (Median Size), and 90% ($D_{10}$, $D_{50}$, and $D_{90}$, Respectively)

Each particle size was determined by dispersing aluminum nitride powder in a sodium pyrophosphate aqueous solution with a homogenizer, and performing measurement by a laser diffraction method using MICROTRAC HRA manufactured by MicrotracBEL Corp.

(2) Specific Surface Area

The specific surface area of an aluminum nitride powder was measured by a BET method using a fluidized surface area automatic measuring device Flow Sorb 2300 manufactured by Shimadzu Corporation.

(3) Total Oxygen Content

The total oxygen content in an aluminum nitride powder was measured using an in-ceramic oxygen-nitrogen analyzer EMGA-620 W manufactured by HORIBA, Ltd.

(4) Pressurized Bulk Density

The pressurized bulk density of an aluminum nitride powder was determined by preparing a pellet having a diameter of 20 mm and a thickness of 2.0 mm at a pressing pressure of 200 kg/cm$^2$, and measuring the size and mass of the pellet.

(5) Sphericity

The sphericity of an aluminum nitride powder was determined by selecting 100 arbitrary particles from a photographic image of an electron microscope, measuring the major axis and minor axis of each of the particle images using a scale, and averaging values of (minor axis)/(major axis).

Example 1 and Comparative Example 1

280 g of α-alumina having an average particle size of 1.0 μm and a specific surface area of 6 m$^2$/g and 140 g of carbon black having a specific surface area of 110 m²/g were mixed for two hours with a dry vibration ball mill, and then nitrided at a firing temperature of 1600° C. for firing time of ten hours in a nitrogen atmosphere to obtain a synthetic powder.

The obtained synthetic powder was supplied from the hopper of the apparatus illustrated in FIG. 1 with an ejector using compressed air at 0.3 MPa such that the concentration of the synthetic powder at normal pressure was 0.3 kg/Nm³, and treated to be disintegrated. The treated aluminum nitride powder was sent to a bag filter through a pipe and collected, and then decarburized at 650° C. for three hours under an air atmosphere in a container with a stirring function equipped with a heater to obtain an aluminum nitride powder.

As Comparative Example 1, the synthetic powder of Example 1 not subjected to the disintegration treatment was decarburized under similar conditions.

The specific surface area, the pressurized bulk density, $D_{10}$, $D_{50}$, and $D_{90}$, the total oxygen content, and the particle size distribution of each of the aluminum nitride powder of Example 1 subjected to the decarburization treatment after the disintegration treatment and the aluminum nitride powder of Comparative Example 1 obtained by decarburizing the synthetic powder not subjected to the disintegration treatment were measured. Results thereof are indicated in Table 1 and FIG. 2. In addition, the sphericity of each powder was 0.9 or more.

Comparative Example 2

280 g of α-alumina having an average particle size of 1.0 μm and a specific surface area of 6 m²/g and 140 g of carbon black having a specific surface area of 110 m²/g were mixed for two hours with a dry vibration ball mill, and then nitrided at a firing temperature of 1700° C. for firing time of ten hours in a nitrogen atmosphere to obtain a synthetic powder.

The synthetic powder not subjected to the disintegration treatment was decarburized to obtain an aluminum nitride powder. The specific surface area, $D_{10}$, $D_{50}$, and $D_{90}$, total oxygen content, and pressurized bulk density of the obtained aluminum nitride powder were measured, and results thereof are indicated in Table 1.

Examples 2 and 3

An aluminum nitride powder was obtained in a similar manner to Example 1 except that the disintegrating conditions of the synthetic powder with the ejector were changed as indicated in Table 1. The specific surface area, $D_{10}$, $D_{50}$, and $D_{90}$, total oxygen content, and pressurized bulk density of the obtained aluminum nitride powder were measured, and results thereof are indicated in Table 1.

Example 4

The synthetic powder obtained in Comparative Example 2 was disintegrated in a similar manner to Example 1, and then decarburized similarly to obtain an aluminum nitride powder. The specific surface area, $D_{10}$, $D_{50}$, and $D_{90}$, total oxygen content, and pressurized bulk density of the obtained aluminum nitride powder were measured, and results thereof are indicated in Table 1.

[Sintered Body Shrinkage Ratio]

Using the aluminum nitride powder obtained in each of Examples and Comparative Examples, granules having a particle size of about 80 μm were manufactured under the same conditions, and then the granules were press-molded at a pressure of 1.92 t/cm³ to prepare a rectangular parallelepiped molded body. The size ($L_0$) of the molded body in the longest direction was measured. Thereafter, the molded body was sintered at 1800° C. to manufacture a sintered body. The size ($L_s$) of the obtained sintered body in the longest direction was measured in a similar manner to the molded body, and a shrinkage ratio (%) was calculated by the following formula, which is also indicated in Table 1.

Note that the shrinkage ratio indicated in Table 1 is an average value of shrinkage ratios obtained by preparing ten sintered bodies for each aluminum nitride powder and calculating the shrinkage ratios of the sintered bodies.

Shrinkage ratio (%)=$(L_0-L_s) \times 100/L_0$

TABLE 1

| | | Comparative Example 1 | Comparative Example 2 | Example 1 | Example 2 | Example 3 | Example 4 |
|---|---|---|---|---|---|---|---|
| disintegrating conditions | Treatment pressure MPa | — | — | 0.5 | 0.3 | 0.7 | 0.5 |
| | Synthetic powder concentration kg/Nm³ | — | — | 0.3 | 0.5 | 0.2 | 0.3 |
| Powder physical properties | Specific surface area m²/g | 2.9 | 2.4 | 2.9 | 2.9 | 2.9 | 2.4 |
| | Particle size $D_{10}$ μm | 0.64 | 0.72 | 0.66 | 0.64 | 0.62 | 0.65 |
| | Particle size $D_{50}$ μm | 1.07 | 1.43 | 1.03 | 1.02 | 0.96 | 1.12 |
| | Particle size $D_{90}$ μm | 2.58 | 3.93 | 1.89 | 2.06 | 1.79 | 2.17 |
| | $D_{90}/D_{50}$ | 2.4 | 2.8 | 1.8 | 2.0 | 1.9 | 1.9 |
| | Total oxygen content % | 1.02 | 0.83 | 1.08 | 1.02 | 1.11 | 0.91 |
| | Degree of aggregation | 1.69 | 1.86 | 1.62 | 1.61 | 1.51 | 1.46 |
| | Sphericity | 0.91 | 0.90 | 0.91 | 0.91 | 0.92 | 0.91 |
| Pressurized bulk density g/cm³ | | 1.58 | 1.55 | 1.63 | 1.63 | 1.66 | 1.62 |
| Sintered body shrinkage ratio % | | 17 | 18 | 14 | 15 | 14 | 15 |

Figure 2:
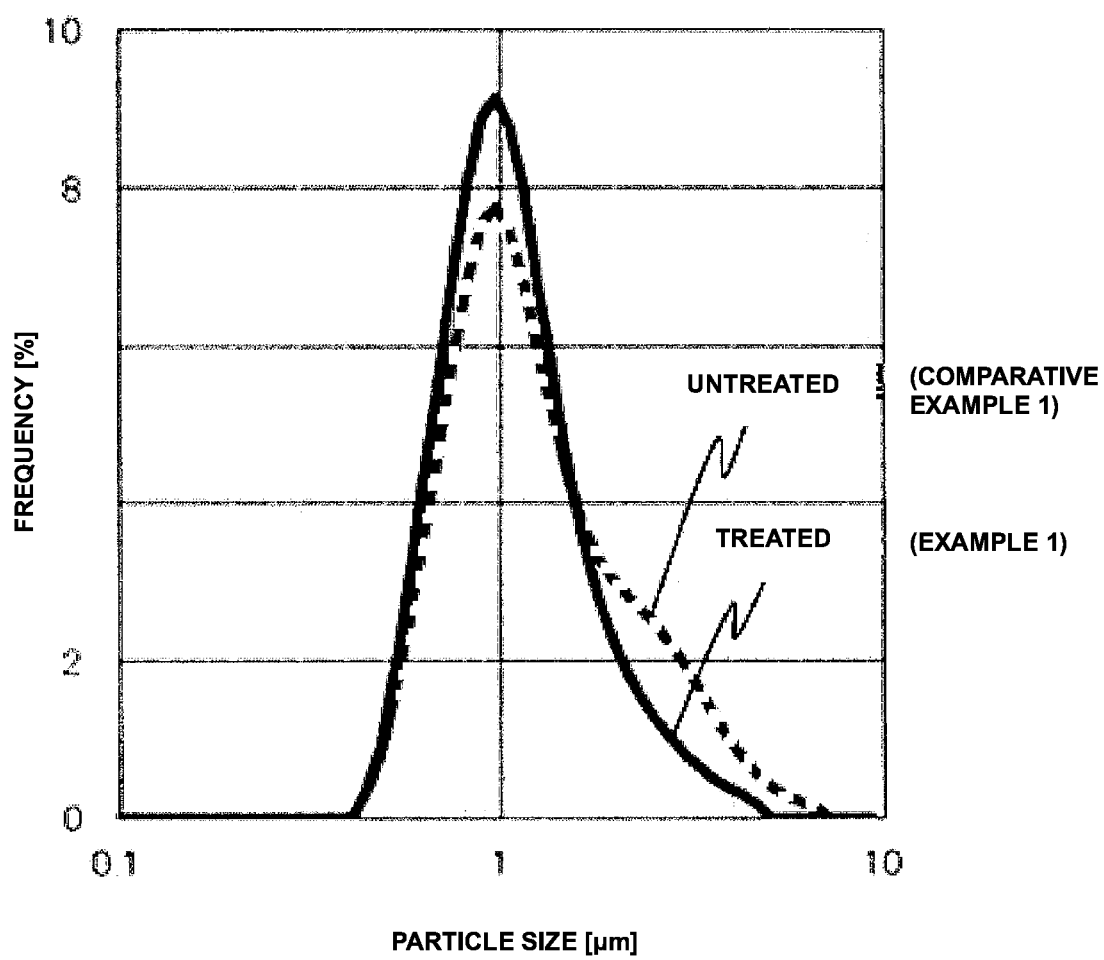
FIG. 2 is a graph indicating a change in particle size distribution by a disintegration treatment.

By performing the disintegration treatment, the $D_{90}$ of an aluminum nitride powder finally obtained largely decreased, and the pressurized bulk density increased. In addition, FIG. 2 illustrating the particle size distribution of an obtained aluminum nitride powder indicates that the shoulder portion on the large particle side in Comparative Example 1 has disappeared by the disintegration treatment and the rising angle of the particle size distribution curve is sharp, and $D_{90}/D_{50}$ of the aluminum nitride powder of Comparative Example 1 obtained without performing the disintegration treatment of the present invention was 2.4, whereas $D_{90}/D_{50}$ of the aluminum nitride powder of Example 1 obtained by performing the disintegration treatment of the present invention was 1.8.

The invention claimed is:

1. An aluminum nitride powder comprising primary particles having a sphericity of 0.8 or more, wherein a median size $D_{50}$ obtained by a laser diffraction method is 0.5 to 1.5 μm, a ratio $D_{90}/D_{50}$ of a particle size $D_{90}$ corresponding to a cumulative undersize distribution of 90% to the $D_{50}$ is 2.0 or less, and a particle size $D_{10}$ corresponding to a cumulative undersize distribution of 10% is ranged from 0.62 μm to 0.66 μm, a BET specific surface area is 2 to 4 $m^2/g$, a total oxygen content is 0.6 to 1.2% by mass, and a pressurized bulk density is 1.62 $g/cm^3$ or greater, wherein the aluminum nitride powder is prepared by:

reducing and nitriding a raw material powder containing an aluminum oxide powder and a carbon powder under nitrogen to produce a synthetic powder containing aluminum nitride aggregated particles and a carbon powder;

disintegrating the synthetic powder in a disintegrating treatment without using a medium to produce a disintegrated synthetic powder; and oxidizing off excess carbon from the disintegrated synthetic powder to obtain the aluminum nitride powder.

2. The aluminum nitride powder according to claim 1, wherein a degree of aggregation calculated from the median size $D_{50}$ and the BET specific surface area by the following formula is within a range of 1.1 to 2.2

$$\text{Degree of aggregation} = D_{50}/D_{BET},$$

wherein $D_{BET} = 6/(\rho \times S)$, wherein:

S: BET specific surface area, $D_{BET}$: primary particle size calculated from BET specific surface area, $D_{50}$: a median size obtained by laser diffraction method, and ρ: true specific gravity of AlN (3.26 $g/cm^3$).

3. The aluminum nitride powder of claim 1, wherein the disintegrating treatment is performed with an ejector.

4. The aluminum nitride powder of claim 1, wherein the pressurized bulk density of the aluminum nitride powder is from 1.62 $g/cm^3$ to 1.66 $g/cm^3$.

* * * * *